United States Patent
Croxford et al.

(10) Patent No.: US 10,922,833 B2
(45) Date of Patent: Feb. 16, 2021

(54) IMAGE PROCESSING

(71) Applicants: Apical Ltd, Cambridge (GB); Arm Limited, Cambridge (GB)

(72) Inventors: Daren Croxford, Swaffham Prior (GB); David Hennah Mansell, Norwich (GB)

(73) Assignees: Apical Ltd., Cambridge (GB); Arm Limited, Cambridge (GB)

( * ) Notice: Subject to any disclaimer, the term of this patent is extended or adjusted under 35 U.S.C. 154(b) by 298 days.

(21) Appl. No.: 15/980,322

(22) Filed: May 15, 2018

(65) Prior Publication Data

US 2019/0355142 A1     Nov. 21, 2019

(51) Int. Cl.
*G06T 7/60* (2017.01)
*G06T 1/60* (2006.01)
*G06T 1/20* (2006.01)

(52) U.S. Cl.
CPC .......... *G06T 7/60* (2013.01); *G06T 1/20* (2013.01); *G06T 1/60* (2013.01)

(58) Field of Classification Search
CPC ........ G06N 3/0454; G06N 3/02; G06N 20/00; G06K 9/6267; G06K 9/6262; G06K 9/00288; G06K 9/628; G06K 9/6284; G06T 2207/20084; G06T 7/60; G06T 1/20; G06T 1/60
See application file for complete search history.

(56) References Cited

U.S. PATENT DOCUMENTS

| | | | | |
|---|---|---|---|---|
| 5,825,936 | A * | 10/1998 | Clarke | G06T 7/0012 382/261 |
| 10,460,175 | B1 * | 10/2019 | Gould | G06K 9/00718 |
| 2011/0007961 | A1 * | 1/2011 | Iwanaga | G01N 21/8851 382/149 |
| 2013/0282635 | A1 * | 10/2013 | Dull | G06N 3/08 706/25 |
| 2015/0340032 | A1 * | 11/2015 | Gruenstein | G06N 3/08 704/232 |
| 2016/0093294 | A1 * | 3/2016 | Kapralova | G10L 15/16 704/232 |

(Continued)

OTHER PUBLICATIONS

Dai, Jifeng, Kaiming He, and Jian Sun. "Instance-aware semantic segmentation via multi-task network cascades." In Proceedings of the IEEE Conference on Computer Vision and Pattern Recognition, pp. 3150-3158. 2016. (Year: 2016).*

*Primary Examiner* — Carol Wang
(74) *Attorney, Agent, or Firm* — EIP US LLP

(57) ABSTRACT

A method of processing image data representative of an image using a multi-stage system comprising a first neural network (NN) for identifying a first image characteristic and a second NN for identifying a second image characteristic. The method comprises processing the image data using t a first at least one layer of the first NN to generate feature data representative of at least one feature of the image and processing the feature data using a second at least one layer of the first NN to generate first image characteristic data indicative of whether the image includes the first image characteristic. The feature data is transferred from the first NN to the second NN. The feature data is processed using the second NN to generate second image characteristic data representative of whether the image includes the second image characteristic.

19 Claims, 3 Drawing Sheets

(56) References Cited

U.S. PATENT DOCUMENTS

| | | | |
|---|---|---|---|
| 2017/0046613 A1* | 2/2017 | Paluri | G06N 3/0454 |
| 2017/0083511 A1* | 3/2017 | Hartrell | G06F 17/00 |
| 2017/0206431 A1* | 7/2017 | Sun | G06F 16/5838 |
| 2017/0345181 A1* | 11/2017 | Yu | H04N 7/181 |
| 2018/0068218 A1* | 3/2018 | Yoo | G06K 9/4604 |
| 2018/0108369 A1* | 4/2018 | Gross | G06N 3/08 |
| 2018/0174046 A1* | 6/2018 | Xiao | G06K 9/46 |
| 2018/0247107 A1* | 8/2018 | Murthy | G06T 7/0012 |
| 2018/0253637 A1* | 9/2018 | Zhu | G06N 3/0454 |
| 2019/0034762 A1* | 1/2019 | Hashimoto | G06K 9/6268 |
| 2019/0087647 A1* | 3/2019 | Du | G06K 9/00275 |
| 2019/0205618 A1* | 7/2019 | Jiang | G06N 3/08 |
| 2019/0205626 A1* | 7/2019 | Kim | G06K 9/00302 |
| 2019/0243755 A1* | 8/2019 | Luo | G06N 3/04 |
| 2019/0279293 A1* | 9/2019 | Tang | G06Q 40/025 |
| 2019/0280869 A1* | 9/2019 | Streit | H04L 9/008 |
| 2019/0340010 A1* | 11/2019 | Lee | G06F 8/41 |

\* cited by examiner

IMAGE PROCESSING

BACKGROUND OF THE INVENTION

Technical Field

The present invention relates to methods and apparatus for processing image data representative of an image.

SUMMARY

Background

Methods to process image data, for example to detect characteristics of an image such as objects in the image, may be computationally intensive. It is desirable to reduce the processing demands of such methods.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Figure 1:
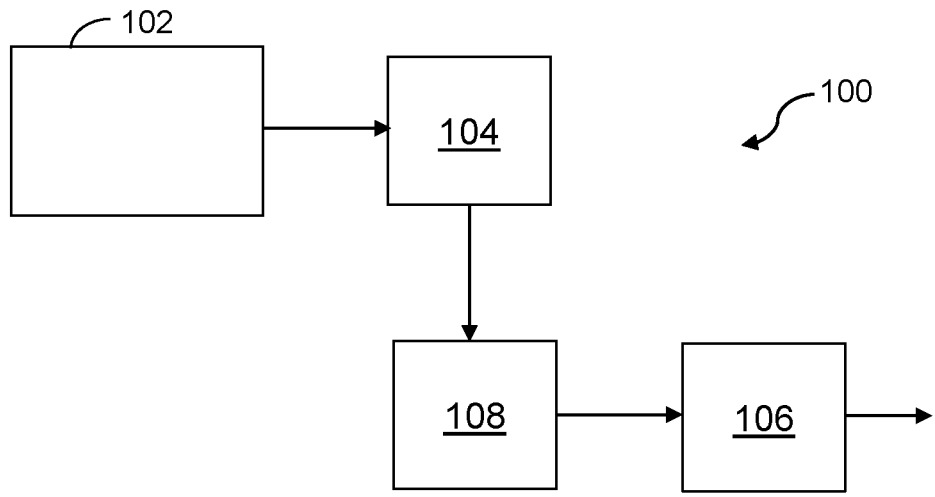
FIG. 1 shows schematically a method of processing image data using a multi-stage system according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Methods described herein relate to processing image data representative of an image using a multi-stage system. The multi-stage system includes a first neural network for identifying a first image characteristic and a second neural network for identifying a second image characteristic different from the first image characteristic. For example, the first image characteristic may be the presence of an object of a predetermined class. In such cases, the first neural network may be considered to be or form part of an object detection system. An object detection system for example allows objects belonging to a particular class of objects to be detected in the image. For example, where the class is human faces, the object detection system may be used to detect the presence of a human face in the image. The second image characteristic may for example be a more specific image characteristic than the first image characteristic. For example, the second image characteristic may be a particular instance of an object of a predetermined class, such as a particular instance of the object of the predetermined class the first neural network is configured to identify. In such cases, the second neural network may be considered to be or form part of an object identification system. An object identification system for example allows instances of the object to be identified. For example, the instance may be a particular human face. In this example, the object identification system may therefore be used to identify that a human face detected by the object detection system is the particular human face the object identification system is arranged to identify. The first neural network may thus be used to identify objects belonging to a class or other group of objects (which may be objects of the same type or with similar or shared characteristics, such as human faces, humans in general, animals, cars and so forth), whereas the second neural network may be used to identify an instance belonging to the class of objects the object detection system is arranged to detect.

This is merely an example though. In other cases, the first neural network and the second neural network may be configured to identify other image characteristics which may be or the same or a similar level of specificity. For example, the first neural network may be configured to identify whether the image includes an object of a first predetermined class (such as cats) and the second neural network may be configured to identify the image includes an object of a second, different, predetermined class (such as cars).

Furthermore, in some cases the multi-stage system may include additional stages, for example additional sub-systems, such as one or more additional neural networks, which may be similar to the first and/or second neural networks but may be configured to identify different image characteristics than the first and/or second neural networks. An image characteristic that may be identified by a neural network, such as the first and second neural networks, may be considered to be any feature of the image which is indicative of a content of the image, such as whether the image includes particular objects, instances of objects, places, or image effects.

The multi-stage system may be considered to be a multi-pass system, with different sub-systems that are specialized to perform different tasks. In examples herein, the sub-systems include the first neural network and the second neural network. By dividing a relatively complex task (such as object identification) into multiple stages, the methods described herein may reduce the amount of image data to be processed. For example, the image data may be processed by the first neural network (which may be more complex than the second neural network) only after the first neural network has determined that the image includes the first image characteristic, or that the image is likely to include the first image characteristic. Hence, in cases in which the first neural network identifies that the image does not contain or is unlikely to contain the first image characteristic (such as an object of a predetermined class, where the first neural network is configured to perform object detection), the image data may not be processed by the second neural network, which may therefore avoid unnecessarily processing the image data where it is unlikely that the image contains the second characteristic to be identified by the second neural network (such as the instance to be identified by the second neural network, where the second neural network is configured to perform object identification).

An example of such a multi-stage system 100 is illustrated schematically in FIG. 1. The multi-stage system 100 receives image data representative of an image 102. The image 102 may correspond to the entirety of a scene captured by an image sensor or to a portion of such a scene.

For example, as described further below, the image 102 may be a block or tile of a larger image, such as a larger image captured by the image sensor.

The image data is transferred to a first neural network 104, which is illustrated in further detail in FIG. 2 (discussed below). The image data is processed using a first at least one layer of the first neural network to generate feature data representative of at least one feature of the image. The feature data is processed using a second at least one layer of the first neural network to generate first image characteristic data indicative of whether the image includes the first image characteristic. For example, where the first neural network is configured to perform object detection, the first neural network may generate object data indicative of whether the image includes an object of a predetermined class.

The feature data is transferred from the first neural network 104 to second neural network 106. In the example of FIG. 1, the feature data is transferred from the first neural network 104 to the second neural network 106 via storage 108, although in other examples the feature data may be transferred directly from the first neural network 104 to the second neural network 106 without being written to the storage 108.

The second neural network 106 processes the feature data to generate second image characteristic data indicative of whether the image includes the second image characteristic. For example, where the second neural network is configured to perform object identification, the second neural network may generate identification data indicative of whether the image includes an instance of the object of the predetermined class. The second neural network 106 of FIG. 1 is shown in further detail in FIG. 2. Features of FIG. 2 which are the same as corresponding features of FIG. 1 are labelled with the same reference numerals. Corresponding descriptions are to be taken to apply.

Figure 2:
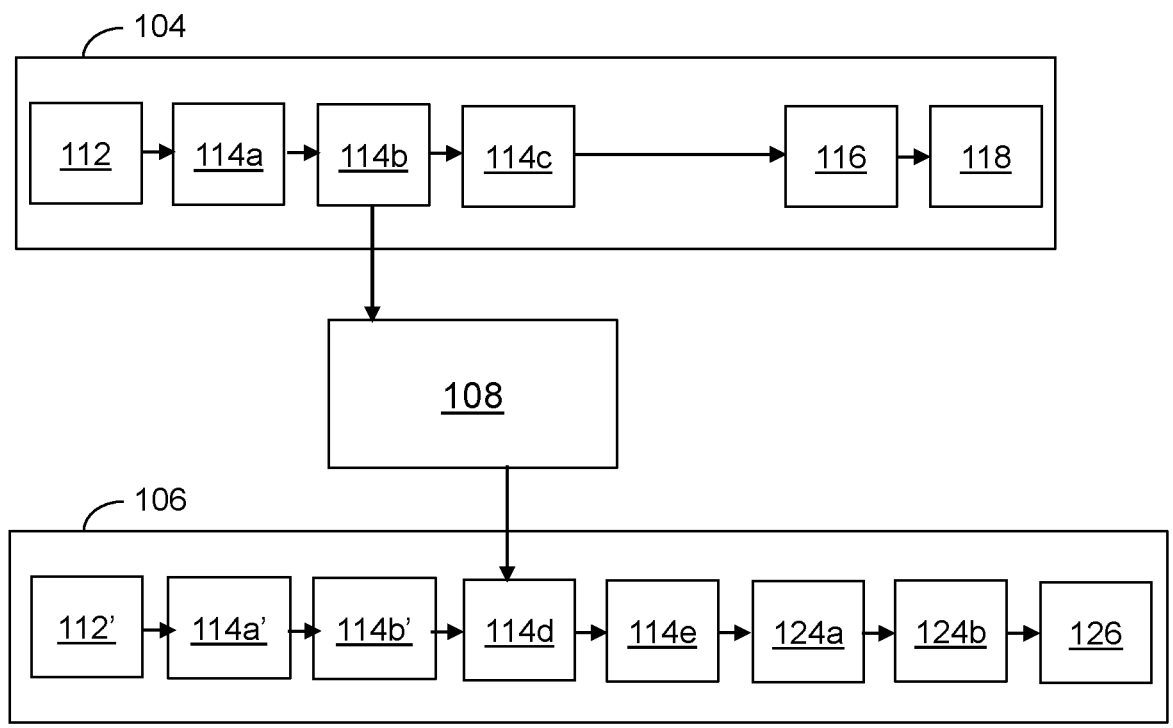
FIG. 2 shows schematically further features of the multi-stage system of FIG. 1.

The first neural network 104 of FIG. 2 includes a number of different layers. In FIG. 2, the first neural network 104 is a convolutional neural network (CNN). An example of a CNN is the VGG-16 CNN, although other CNNs may be used instead. A typical CNN includes an input layer (112), a plurality of convolutional layers (three of which, 114*a*, 114*b*, 114*c*, are shown in FIG. 2), at least one fully connected layer (one of which, 116, is shown in FIG. 2) and an output layer 118. The input layer 112 for example corresponds with an input to the first neural network 110, which in this example is image sensor. The image data is for example 224 pixels wide and 224 pixels high and includes 3 color channels (such as a red, green and blue color channel). The convolutional layers typically extract particular features from the input data, to create feature maps. The fully connected layers then use the feature maps for classification.

In examples in accordance with FIG. 2, the output of the layer 114*a* undergoes pooling before it is input to the layer 114*b*. Pooling for example allows values for a region of an image or a feature map to be aggregated or combined, for example by taking the highest value within a region. For example, with 2×2 max pooling, the highest value of the output of the layer 114*a* within a 2×2 patch of the feature map output from the layer 114*a* is used as an input to the 114*b*, rather than transferring the entire output of the layer 114*a* to the layer 114*b*. This reduces the amount of computation for subsequent layers of the first neural network 104. Further pooling may be performed between other layers of the first neural network 104. Conversely, pooling may be omitted in some cases. It is to be appreciated that the first neural network 104 and the second neural network 106 of FIG. 2 (described further below) have been greatly simplified for ease of illustration and that typical neural networks may be significantly more complex.

In general, neural networks such as the first neural network 104 of FIG. 2 may undergo what is referred to as a training phase, in which the neural network is trained for a particular purpose. A neural network typically includes a number of interconnected nodes, which may be referred to as artificial neurons, or neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer, and may therefore be used to identify overall characteristics of an image, such as whether the image includes an object of a particular class, or a particular instance belonging to the particular class.

In the example of FIG. 2, the first neural network 104 has been trained to perform object detection by processing image data, for example to determine whether an object of a predetermined class of objects is present in the image represented by the image data (although in other examples the first neural network 104 may have been trained to identify other image characteristics of the image instead). Training the first neural network 104 in this way for example generates one or more kernels associated with at least some of the layers (such as layers of the first neural network 104 other than the input layer 112 and the output layer 118). Hence, the output of training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the image characteristics, such as the class of objects, that the first neural network 104 is trained to detect. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3 by 3 image patch) or each element of a feature map by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3 by 3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as an accumulation operation). Thus, a neural network accelerator, such as that of FIG. 4, may include a multiplier-accumulator (MAC) unit configured to perform these operations.

After the training phase, the first neural network 104 (which may be referred to as a trained first neural network 104) may be used to detect the presence of objects of a predetermined class of objects in input images. This process may be referred to as classification or inference. Classification typically involves convolution of the kernels obtained during the training phase with image patches of the image input to the first neural network 104 to generate a feature map. The feature map may then be processed using at least one fully connected layer to classify the image.

In the example of FIG. 2, the layer 114a involves the convolution of 64 different kernels with the image data of the input layer 112. Each of the 64 kernels is for example arranged to identify a different respective feature of the image data. In an illustrative example in which the image data is 224 by 224 pixels, with 3 color channels, and is convolved with 64 kernels of a size of 3 by 3 pixels, the layer 114a of the first neural network 104 involves 224×224×3×(3×3)×64 multiply-accumulate operations, i.e. 86 million multiply-accumulate operations. There will also be a large number of further multiply-accumulate operations associated with each of the further layers 114b, 114c, 116 of the first neural network 104. As will be appreciated, though, other neural networks may involve convolutions with a different number of kernels. Nevertheless, processing an image to identify an image characteristic such as the presence of an object of a predetermined class or a particular instance of the object typically involves a large number of data processing operations, each of which consumes power.

In this case, the inventors have surprisingly realized that neural networks trained to detect or identify different image features or characteristics nevertheless tend to have very similar or identical initial layers. For example, the initial layers of a neural network may identify more general image features, which may be present in images of a wide range of different scenes or objects. As an illustrative example, if one neural network is trained to identify cars in images and a different neural network is trained to identify cats in images, these neural networks may nevertheless share similar or identical initial layers, which identify general image features such as edges, corners, or ridges in the images. Subsequent layers in these neural networks may be different, however, in order to perform a higher level determination of whether lower-level image features correspond to a particular class of object (e.g. a car or a cat), depending on what the neural network has been trained to detect. This principle may be applied in examples described herein to reduce processing in object identification methods and systems.

In the example of FIG. 2, image data received by the input layer 112 of the first neural network 104 is processed using layers 114a, 114b to generate feature data. The image data may represent at least one characteristic of the light captured by an image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

In this example, the layers 114a, 114b correspond to a first at least one layer of the first neural network 104 which are used to generate feature data representative of at least one feature of the image. The feature data may represent an output feature map, which may be output from a convolutional layer of a CNN such as the first neural network 104 of FIG. 2. There may be more or fewer layers in the first at least one layer of the first neural network 104 than those shown in FIG. 2. In examples such as FIG. 2 in which there are plurality of layers in the first at least one layer, each of the layers may be used to generate intermediate feature data representative of at least one feature of the image. The intermediate feature data output from one of the layers (e.g. layer 114a) may be input to a subsequent layer of the first neural network 104 (e.g. layer 114b) to identify further features of the image represented by the image data input to the first neural network 104.

Although not shown in FIG. 2, it is to be appreciated that further processing may be applied to the image data after it has been obtained by an image sensor and before it is processed by the first at least one layer of the first neural network 104, which may be performed by other components of an image processing system or as part of the first neural network 104 itself.

In examples such as FIG. 2 in which the first neural network 104 is a CNN, each of the first at least one layer (in this example, the layers 114a, 114b) may be a convolutional layer, respectively. After the first at least one layer, the first neural network 104 may include a second at least one layer (which may include at least one convolutional layer and/or at least one fully connected layer). The second at least one layer of the first neural network 104 in the example of FIG. 2 is arranged to process the feature data to generate object data representative of a class of an object within the image. In FIG. 2, the second at least one layer of the first neural network 104 includes an additional convolutional layer, 114c, which receives the feature data as an input from the layer 114b. The second at least one layer also includes a fully connected layer 116, which in FIG. 2 is arranged to receive output feature data from the additional convolutional layer 114c, which for example represents an output feature map, and to process the output feature data to generate the object data. The object data for example corresponds with the output layer 118 of the first neural network 104. The object data generated by the fully connected layer 116 may provide an indication of whether the first neural network 104 has detected the presence of an object of a predetermined class in the image represented by the image data. In FIG. 2, the first neural network 104 includes solely one fully connected layer 116. However, in other examples, the first neural network 104 may include a plurality of fully connected layers, with an output of one of the fully connected layers being received as an input to a subsequent fully connected layer. It is to be appreciated that the first neural network 104 may be used in a similar way to generate first characteristic data (rather than the object data), which is representative of a first characteristic which may be different from whether the image includes an object of a predetermined class. In such cases, the processing implemented by the second at least one layer of the first neural network 104 may be different, and may for example include different weights associated with neurons of the first neural network, and a different number of layers within the second at least one layer.

In addition to transferring the feature data to additional layer(s) of the first neural network 104, the first neural network 104 of FIG. 2 is also arranged to transfer to the feature data to the second neural network 106. In this example, the feature data is output from the first at least one layer of the first neural network 104 and written to the storage 108. It may then be read from the storage 108 by the second neural network 106. This provides additional flexibility. For example, in other neural networks, feature data which may be generated during processing of image data by a neural network, for example at an intermediate stage, may not be written to storage. Instead, solely an output of the neural network may be written to storage. While this may reduce the number of write actions performed during use of the neural network (and the amount of storage required), this does not provide the flexibility of the multi-stage system shown in FIG. 2, in which the feature data may be read from the storage 108 and re-used as needed.

In the example of FIG. 2, the second neural network 106 includes an input layer 112' and a third at least one layer which corresponds, respectively, to the first at least one layer of the first neural network 104. In this example, the third at least one layer of the second neural network 106 includes layers 114a', 114b' which correspond to layers 114a, 114b of the first at least one layer of the first neural network 104. A correspondence between the third at least one layer of the second neural network 106 and the first at least one layer of the first neural network 104 may imply that each of the third at least one layer of the second neural network 106 is identical to a corresponding layer of the first at least one layer of the first neural network 104. For example, the weights associated with these layers may be the same as each other (where each entry of a kernel for example corresponds with a weight). Alternatively, each of the third at least one layer of the second neural network 106 may be sufficiently similar to a corresponding layer of the first at least one layer of the first neural network 104 in order to extract the same features as each other. For example, a weight difference between the weights associated with a layer of the first at least one layer and a corresponding layer of the third at least one layer may be less than a predetermined threshold amount.

In examples such as FIG. 2, the first at least one layer may be an initial at least one convolutional layer of the first neural network 104, which for example corresponds with the earliest at least one layer of a series of convolutional layers of the first neural network 104 through which input data may be sequentially processed.

In FIG. 2, the second neural network 106 is also a CNN and each of the third at least one layer of the second neural network 106 is a convolutional layer, respectively. In such cases, the third at least one layer may also be an initial at least one convolutional layer of the second neural network 106. In this way, each of the first and third at least one layers may correspond to the initial layers of the first and second neural networks 104, 106 which are used to extract the same higher level features from an input image as each other.

Because of this overlap in function of the first at least one layer of the first neural network 104 and the third at least one layer of the second neural network 106, the third at least one layer of the second neural network 106 may be bypassed during processing of an image that has already been at least partially processed by the first neural network 104. For example, the third at least one layer of the second neural network 106 may be bypassed by transferring the feature data from the first neural network 104 to the fourth at least one layer of the second neural network 106, for example without transferring the feature data to the third at least one layer of the second neural network 106.

This is shown in FIG. 2, in which the feature data output from the layer 114b (which may be considered to be a final or last layer of the first at least one layer of the first neural network 104) is written to storage 108 and is subsequently retrieved from the storage 108 by a fourth at least one layer of the second neural network 106. The retrieval of the feature data from the storage 108 in such cases is therefore performed before the feature data is processed using the second neural network 106. As described further below, the storage may be a main memory or a local memory of a processor configured to implement the first and/or second neural networks 104, 106. The feature data written to storage 108 may represent a feature map derived from an entirety of the image, or from a portion of the image, such as a portion identified as a region of interest.

With this approach, rather than redoing the same initial processing as performed by the first at least one layer of the first neural network 104, the second neural network 106 may instead read the feature data output from the first at least one layer from the storage 108, which may be more efficient and may reduce the amount of processing performed by the second neural network 106. Although the second neural network 106 of FIG. 2 is shown as including the third at least one layer which corresponds to the first at least one layer of the first neural network 104, in other examples, the third at least one layer of the second neural network 106 may be omitted when the second neural network 106 is used for classification. For example, the second neural network 106 may be trained so that the third at least one layer corresponds to the first at least one layer of the first neural network 104. However, the third at least one layer may not necessarily be present in a processor or other system arranged to implement the second neural network 106. For example, such a processor or system may not include or access weight data corresponding to weights associated with the third at least one layer during implementation of the second neural network 106 for classification.

In examples in accordance with FIG. 2, the first neural network 104 and the second neural network 106 have been trained to perform different functions, for example to identify different image characteristics of an input image. In the example of FIG. 2, while the first neural network 104 has been trained to detect objects of a predetermined class, the second neural network 106 has been trained to identify whether the image includes an instance of an object of the predetermined class. Object identification as performed by the second neural network 106 in the example of FIG. 2 may be a more complex task than object detection as performed by the first neural network 104. Hence, the second neural network 106 may have a greater complexity than the first neural network 104. The complexity of a neural network may be determined or assessed based on certain characteristics of the neural network such as the number of neurons, the number of layers and/or the number of interconnections between neurons. In FIG. 2, the second neural network 106 includes more layers than the first neural network 104. However, in other examples, the second neural network 106 may be more complex than the first neural network 104 by virtue of other characteristics than a number of layers.

As explained above, the second neural network 106 of FIG. 2 includes a fourth at least one layer which receives the feature data from the first neural network 104. The fourth at least one layer is for example arranged to process the feature data to generate second image characteristic data indicative of whether the image includes a second image characteristic different from a first image characteristic identifiable by the first neural network 104. In the example of FIG. 2, the fourth at least one layer is arranged to generate identification data indicative of whether the image includes an instance of the object of the predetermined class. In FIG. 2, the fourth at least one layer of the second neural network 106 includes two further convolutional layers, 114d, 114e, two fully connected layers 124a, 124b, and an output layer 126, although this is merely an illustrative example and other arrangements are possible. As explained above, the instance of the object the second neural network 106 is arranged to identify in the example of FIG. 2 is for example a particular or specific entry belonging to the class the first neural network 104 is configured to detect. For example, where the first neural network 104 is configured to detect human faces, the second neural network 106 may be configured to detect a particular human face, such as face of a specific person.

Figure 3:
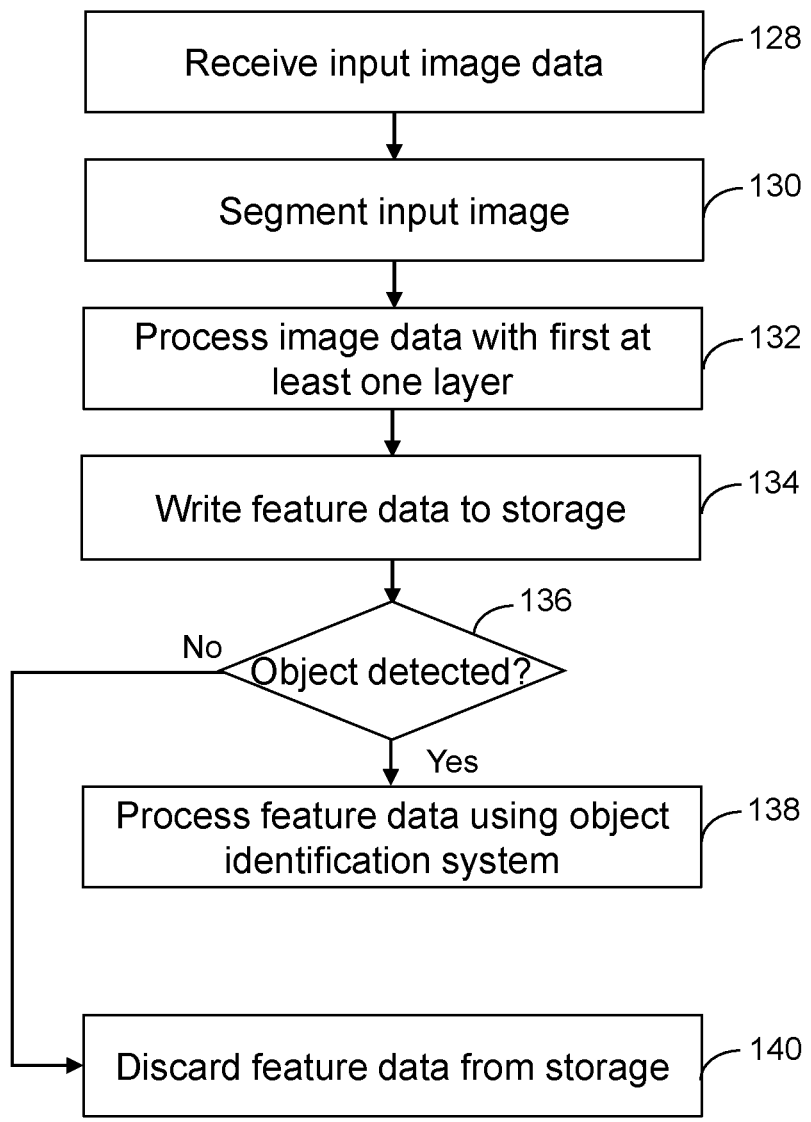
FIG. 3 is a flow diagram illustrating a method of processing image data according to examples.

FIG. 3 is a flow diagram illustrating a method of processing image data according to examples. The method of FIG. 3 may be used with the first neural network 104 and the second neural network 106 of FIGS. 1 and 2, for example. In FIG. 3, the first neural network 104 is configured to perform object detection and the second neural network 106 is configured to perform object identification. However, as emphasized above, this is merely an illustrative example and in other examples the first and second neural networks 104, 106 may be configured to identify first and second image characteristics, which may or may not be an object of a particular class or an instance of an object of a particular class.

At item 128 of FIG. 3, input image data representative of an input image is received. At item 130, the input image data is processed to segment the input image into a plurality of blocks. A block of the plurality of blocks for example corresponds to the image represented by the image data, which may be processed as described with reference to FIGS. 1 and 2. Each block may be a predetermined size, and may be considered to correspond to a tile of a larger image, such as the input image. The block may be any shape (not merely square or rectangular) and some blocks may be of a different shape and/or size than other blocks. The size of blocks may depend on the available processing capacity of an image processing system arranged to process the input image or may be a fixed size. By dividing the input image into blocks, blocks which contain objects may be identified, for example as regions of interest that may be subjected to further processing without processing of other blocks which do not contain particular objects (such as blocks of the image corresponding to a background of a scene, such as the sky or grass). This may reduce unnecessary processing of image data, by focusing resources on portions of the image that are more likely to contain objects of interest.

At item 132 of FIG. 3, the image data (which in this case is representative of the block) is processed with the first at least one layer of the first neural network 104, for example as described above with reference to FIG. 2. The feature data generated by the first at least one layer of the first neural network 104 is written to storage at item 134 of FIG. 3.

At item 136 of FIG. 3, the first neural network determines whether the block includes an object of a predetermined class, such as human faces. If the object detection system determines that the block (which in this case corresponds to the image represented by the image data) includes an object of the predetermined class, the feature data is processed at item 138 using the second neural network. In this way, the feature data may be processed using the second neural network in response to the first neural network identifying that the image includes the first image characteristic (in this case, in response to the first neural network determining that the class of the object is a predetermined class).

Conversely, if the first neural network determines that the image does not include the first image characteristic (such as an object of the predetermined class), the feature data is discarded from the storage at item 140. In this way, space may be created in the storage for storing feature data of other images or other blocks of the input image which do include the first image characteristic.

In the example of FIG. 3, the feature data is written to storage before it is determined whether the image includes the first image characteristic. This may occur because the feature data may be generated partway through identifying the first image characteristic, and before the first neural network has reached a determination of whether the image includes the first image characteristic.

In other examples, though, the feature data may be written to storage after it is determined that the image includes the first image characteristic. For example, the feature data may be stored in a temporary storage area such as a buffer during determination of whether the image includes the first image characteristic. Subsequently, the feature data may be written to other storage such as a cache, from which it may be retrieved rapidly by the second neural network. For example, the feature data may be written to storage without writing further feature data to the storage, where the further feature data corresponds to a further block of a plurality of blocks of an input image which the first neural network has determined does not include the first image characteristic, such as an object of the predetermined class.

Figure 4:
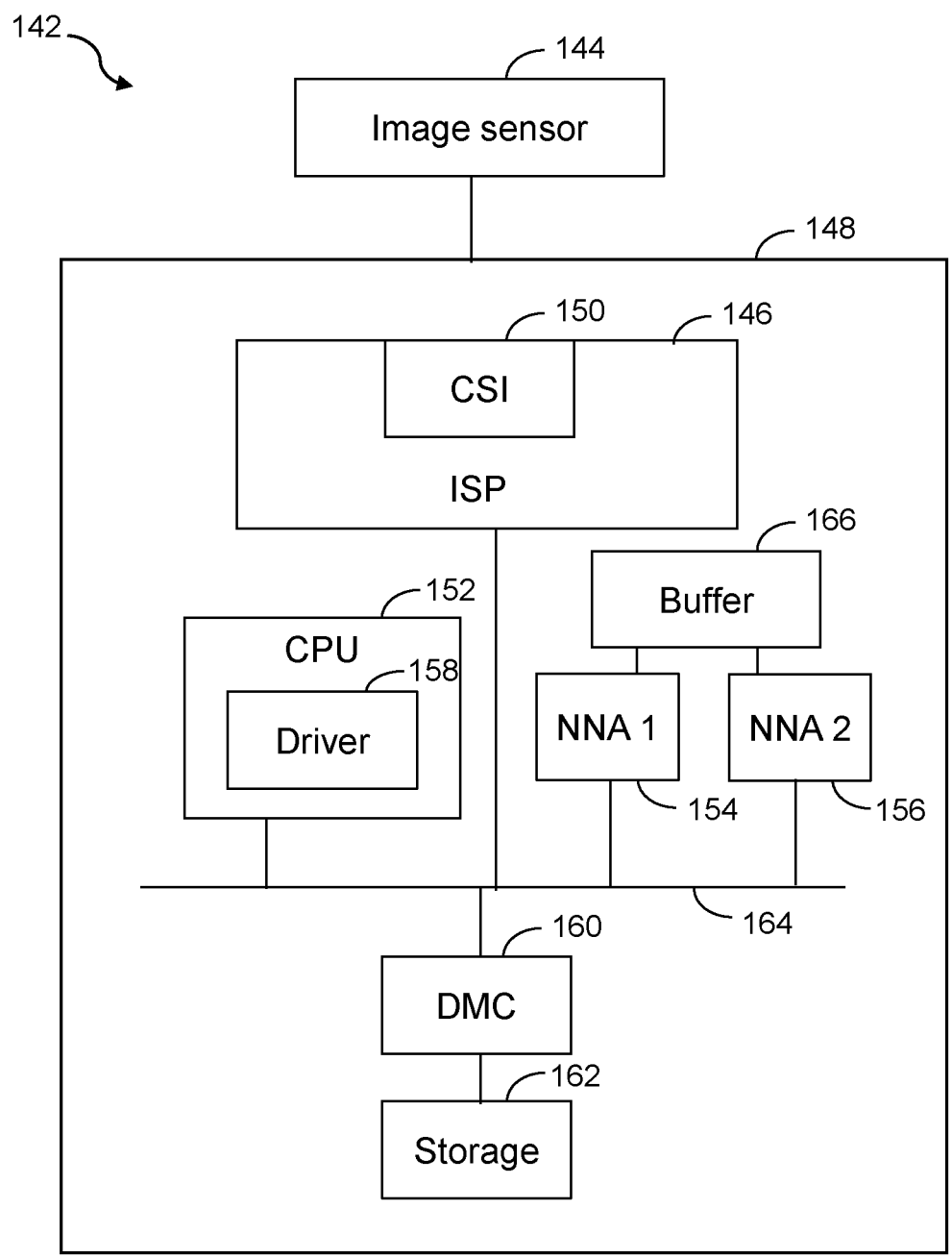
FIG. 4 shows schematically an example image processing system for use with the methods described herein.

An example of an image processing system 142 for use with the methods described herein, such as the methods of FIGS. 1 to 3, is shown schematically in FIG. 4. The image processing system 142 of FIG. 4 may be coupled to or form part of a computer device, such as a personal computer, a laptop, a smartphone or an on-board computer device which may be coupled to or mounted within a vehicle such as a car.

The image processing system 142 includes an image sensor 144. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 144 in this example is arranged to capture image data representative of an image. The image may form part of a video, which is typically a series of images captured sequentially. For example, the image may correspond to a frame of a video.

In FIG. 4, the image sensor 144 is arranged to transfer image data to an image signal processor (ISP) 146 of a computing system 148 via a camera serial interface (CSI) 150. The ISP 146 may perform initial processing of the image data to prepare the image data for display. For example, the ISP 146 may perform saturation correction, renormalization, white balance adjustment and/or demosaicing, although this is not to be taken as limiting.

The computing system 148 of FIG. 4 includes at least one processor. In this example, the computing system 148 includes a central processor unit (CPU) 134. The computing system 148 also includes at least one neural network accelerator. A neural network accelerator is for example a processor dedicated to implementing at least classification of data using a neural network. A neural network accelerator is for example a processor dedicated to implementing at least classification of data using a neural network. The at least one neural network accelerator is configured to implement first and second neural networks such as those described above. The at least one neural network may be a neural network accelerator (such as a single or sole neural network accelerator) configured to implement both the first and second neural networks. However, in the example of FIG. 4, the at least one neural network includes a first neural network accelerator 154 and a second neural network accelerator 156. in the example of FIG. 4, the first neural network accelerator 154 is configured to implement a first neural network such as that described above, and the second neural network accelerator 156 is configured to implement a second neural network such as that described above.

In other examples, though, the computing system 148 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 148 may also or alternatively include a processor implemented as a combination of computing devices, e.g., a combination of a DSP and a microprocessor, a plurality of microprocessors, one or more microprocessors in conjunction with a DSP core, or any other such configuration. The computing system 148 may also or alternatively include at least one graphics processing unit (GPU). The first and/or second neural network may be implemented by one of these other processors in examples.

The CPU 152 of FIG. 4 includes a driver 158 which for example provides an interface between software configured to control or configure the neural network and the at least one neural network accelerator which is configured to perform the processing to implement the first and second neural networks. In other examples, though, a neural network may be implemented using a more general processor, such as the CPU or a GPU, as explained above. The driver 158 may be considered to be or form part of a control system configured to control the at least one neural network accelerator. For example, such a control system may be configured to control the transfer of the feature data from the first neural network implemented to the second neural network.

The computing system 148 of FIG. 4 also includes a dynamic memory controller (DMC) 160 which may be used to control access to storage 162 of the computing system 148. The storage 162 is for example external to the at least one neural network accelerator, and in the example of FIG. 4 may be external to the first and second neural network accelerators 154, 156. The storage 162 may be a random access memory (RAM) such as DDR-SDRAM (double data rate synchronous dynamic random access memory). In other examples, the storage 162 may be or include a non-volatile memory such as Read Only Memory (ROM) or a solid state drive (SSD) such as Flash memory. The storage 162 in examples may include further storage devices, for example magnetic, optical or tape media, compact disc (CD), digital versatile disc (DVD) or other data storage media. The storage 162 may be removable or non-removable from the computing system 148. The storage 162 is for example arranged to store image data representative of an image, which may be received from the ISP 146.

The components of the computing system 148 in the example of FIG. 4 are interconnected using a systems bus 164. This allows data to be transferred between the various components. The bus 164 may be or include any suitable interface or bus. For example, an ARM® Advanced Microcontroller Bus Architecture (AMBA®) interface, such as the Advanced eXtensible Interface (AXI), may be used.

In addition to the storage 162, which may be system storage or a main memory, the computing system 148 of FIG. 4 includes storage (in this example a buffer 166) which is accessible to the at least one neural network accelerator, in this case to the first and second neural network accelerators 154, 156. For example, the first neural network accelerator 154 may be configured to write the feature data (described above) to the buffer 166, and the second neural network accelerator 156 may be configured to read the feature data from the buffer 166.

In the example of FIG. 4, the computing device 148 may be considered to include a neural network accelerator system including the first neural network accelerator 154 and the second neural network accelerator 156. in such examples, the buffer 166 may be considered to be local storage of the neural network accelerator system, which is accessible to the first and second neural network accelerators 154, 156. For example, the neural network accelerator system including the first and second neural network accelerators 154, 156 may be implemented in hardware, for example as a chip, and the buffer 166 may be on-chip memory. The buffer 166 may for example be a static random access memory (SRAM), although other memory types are possible.

In other examples, the computing device 148 may not include such a buffer 166. In such cases, the first neural network accelerator 154 may be configured to write the feature data to the storage 162, which is for example a main memory. In such cases, the second neural network accelerator 156 may be configured to read the feature data from the storage 162.

In other examples in which a neural network accelerator is configured to implement both the first and second neural network, the neural network accelerator may, similarly to the first and second neural networks 154, 156, include local storage. In such cases, the neural network accelerator may be configured to write the feature data to the local storage and read the feature data from the local storage. The local storage may be similar to the buffer 166 of FIG. 4. For example, where the neural network accelerator is implemented in hardware, for example as a chip, the local storage may be on-chip memory. The local storage may for example be a static random access memory (SRAM), although other memory types are possible). In other examples, though, the neural network accelerator may instead write the feature data to the storage 162.

The above examples are to be understood as illustrative examples. Further examples are envisaged. For example, although in examples described above the first and second neural networks are each CNNs, in other examples other types of neural network may be used as the first and/or second neural networks. The method of FIG. 3 involves segmenting an input image into a plurality of blocks. However, this method is merely an example and other methods may instead process an entirety of an image without segmenting the image in accordance with FIG. 3.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of processing image data representative of an image using a multi-stage system comprising a first neural network for identifying a first image characteristic and a second neural network for identifying a second image characteristic different from the first image characteristic, the method comprising:
processing the image data using the first neural network, the processing the image data using the first neural network comprising:
i) processing the image data using a first at least one layer of the first neural network to generate feature data representative of at least one feature of the image, wherein the feature data represents a feature map; and
ii) processing the feature data using a second at least one layer of the first neural network to generate first image characteristic data indicative of whether the image includes the first image characteristic;
transferring the feature data from the first neural network to the second neural network; and
processing the feature data using the second neural network, without processing the image data using the second neural network, to generate second image characteristic data indicative of whether the image includes the second image characteristic.

2. The method according to claim 1, wherein:
the first image characteristic data is indicative of whether the image includes an object of a predetermined class; and
the second image characteristic data is indicative of whether the image includes a particular instance of the object of the predetermined class.

3. The method according to claim 1, wherein the second neural network comprises:
a third at least one layer which corresponds, respectively, to the first at least one layer of the first neural network; and
a fourth at least one layer, wherein the method comprises bypassing the third at least one layer of the second neural network by transferring the feature data from the first neural network to the fourth at least one layer of the second neural network.

4. The method according to claim 3, wherein the second neural network is a second convolutional neural network (CNN), each of the third at least one layer is a convolutional layer, respectively, and the fourth at least one layer comprises a fully connected layer.

5. The method according to claim 1, wherein the first neural network is a convolutional neural network (CNN), each of the first at least one layer is a convolutional layer, respectively, and the second at least one layer comprises a fully connected layer.

6. The method according to claim 1, wherein the second neural network has a greater complexity than the first neural network.

7. The method according to claim 6, wherein the second neural network comprises more layers than the first neural network.

8. The method according to claim 1, wherein transferring the feature data from the first neural network to the second neural network comprises:
writing the feature data to storage after processing the image data using the first at least one layer; and
retrieving the feature data from the storage before processing the feature data using the second neural network.

9. The method according to claim 1, comprising processing the feature data using the second neural network in response to the first neural network determining that the image includes the first image characteristic.

10. The method according to claim 1, comprising:
writing the feature data to storage; and
subsequently, determining whether the image includes the first image characteristic.

11. The method according to claim 10, comprising:
determining that the image does not include the first image characteristic; and
in response, discarding the feature data from the storage.

12. The method according to claim 1, comprising:
receiving input image data representative of an input image comprising the image; and
processing the input image data to segment the input image into a plurality of blocks, a block of the plurality of blocks corresponding to the image.

13. The method according to claim 12, comprising writing the feature data to storage without writing further feature data to the storage, the further feature data corresponding to a further block of the plurality of blocks which the first neural network has determined does not include the first image characteristic.

14. The method according to claim 1, wherein the first at least one layer is an initial at least one convolutional layer of the first neural network.

15. An image processing system comprising:
at least one processor;
storage accessible by the at least one processor, the storage configured to store image data representative of an image; and
at least one neural network accelerator configured to implement a first neural network for identifying a first image characteristic and a second neural network for identifying a second image characteristic different from the first image characteristic, wherein the at least one neural network accelerator is configured to:
process the image data using a first at least one layer of the first neural network to generate feature data representative of at least one feature of the image, wherein the feature data represents a feature map;
process the feature data using a second at least one layer of the first neural network to generate first image characteristic data indicative of whether the image includes the first image characteristic;
receive the feature data from the first neural network; and
process the feature data using the second neural network, without processing the image data using the second neural network, to generate second image characteristic data representative of whether the image includes the second image characteristic.

16. The image processing system according to claim 15, wherein the at least one neural network accelerator is configured to:
   write the feature data to the storage; and
   read the feature data from the storage.

17. The image processing system according to claim 16, wherein the storage is a main memory.

18. The image processing system according to claim 15, wherein the at least one neural network accelerator is a neural network accelerator configured to implement both the first neural network and the second neural network, the neural network accelerator comprising local storage and being configured to:
   write the feature data to the local storage; and
   read the feature data from the local storage.

19. The image processing system according to claim 15, wherein the at least one neural network accelerator comprises:
   a first neural network accelerator configured to implement the first neural network; and
   a second neural network accelerator, different from the first neural network accelerator, configured to implement the second neural network.

* * * * *